(No Model.)
J. N. DODGE.
FISH NET.
No. 270,641. Patented Jan. 16, 1883.
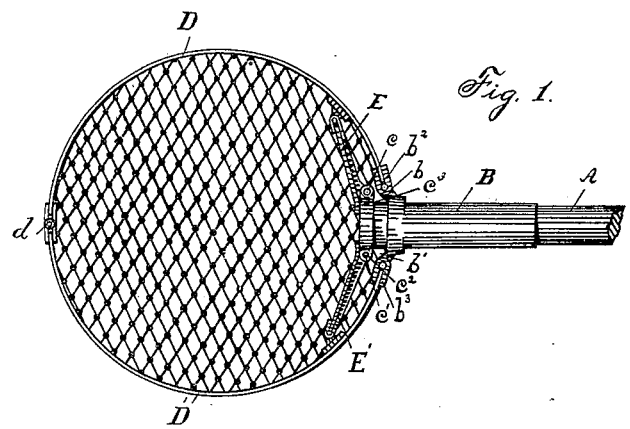
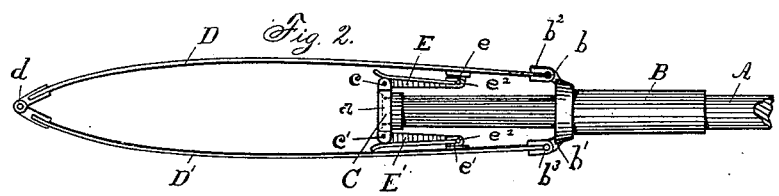
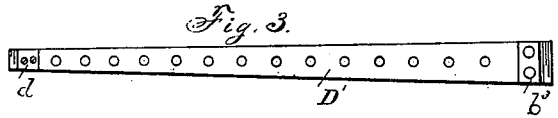
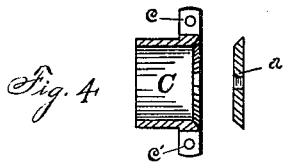
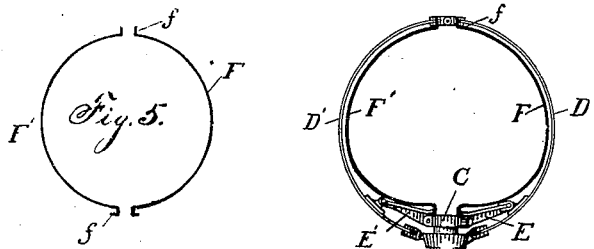
WITNESSES
Samuel C. Thomas.
J. Edward Warren.
INVENTOR
Jasper N. Dodge.
By W. W. Leggett,
Attorney

UNITED STATES PATENT OFFICE.

JASPER N. DODGE, OF DETROIT, MICHIGAN.

FISH-NET.

SPECIFICATION forming part of Letters Patent No. 270,641, dated January 16, 1883.

Application filed April 1, 1882. (No model.)

*To all whom it may concern:*

Be it known that I, JASPER N. DODGE, of Detroit, county of Wayne, State of Michigan, have invented a new and useful Improvement in Landing or Bait Nets; and I declare the following to be a full, clear, and exact description of the same, such as will enable others skilled in the art to which it pertains to make and use it, reference being had to the accompanying drawings, which form a part of this specification.

My invention consists in the combinations of devices and appliances hereinafter specified, and more particularly pointed out in the claims.

In the drawings, Figure 1 is a plan view of a net embodying my invention, shown as expanded. Fig. 2 is a plan view of the mechanism with the hoop collapsed. Fig. 3 is a separate view of one arm of the hoop. Fig. 4 represents sectional views of the thimble C and the head-plate $a$. Fig. 5 is a separate view of the hoop for bait-net. Fig. 6 is a plan view of the mechanism with the hoop for bait-net inserted.

It is the object of my invention to provide a strong collapsing landing and minnow or bait net which can be expanded readily for use or collapsed, ready to be packed, as easily as an umbrella, and in a somewhat similar manner, without having to unscrew the head from the pole.

To this end, A is any ordinary fish pole or staff, provided with a head-plate, $a$.

B is a sleeve, provided with two shoulders, $b$ and $b'$, on opposite sides, to which are secured suitable hinges, $b^2$ and $b^3$.

C is a thimble loosely secured upon the staff, provided with shoulders $c$ and $c'$.

D and D' are two arms of a hoop, preferably made of spring-steel, jointed together at their outer ends, as shown at $d$, and fastened at the opposite or inner ends to the hinges $b^2$ and $b^3$ on the sleeve B. These arms of the hoop are made heavier at their inner ends, where the greatest strain comes, as shown in Fig. 3, and preferably perforated for securing the net thereto by passing lower ends of the net-cords through said perforations and tying them across the spaces between perforations.

E and E' are braces, hinged to the shoulders $c$ and $c'$ on the thimble C and to the two arms of the hoop, as shown at $e$ and $e'$. These braces are preferably made of malleable iron castings, provided with a rib, $e^2$, to stiffen them. To prevent the hoop from turning on the staff when expanded, the outer end of the thimble C is countersunk, as shown in Fig. 4, and the edge of the head-plate beveled on its under surface and adapted to fit into the countersunk portion of the thimble when the hoop is expanded. The inner ends of the braces E and E' are also extended beyond their hinged connection at $c$ and $c'$, so that when the hoop is expanded their extended ends shall press upon the head-plate, as shown at $c^2$ and $c^3$, and cause the countersunk end of the thimble to be thus drawn with such force against the beveled edge of the head as to create a friction between the two, which will prevent the thimble from turning under any strain to which it is liable to be subjected. When it is desired to collapse the hoop it can be done by simply forcing the sleeve B downward on the staff, when the arms D D' and braces E E' fold inwardly on the hinges $b^2$ and $b^3$, $c$ and $c'$, $e$ and $e'$, and $d$. When the hoop is thus folded up the net can be conveniently wound about it.

Owing to the heavier construction of the arms D and D' at their inner ends, and the use of the braces E and E', any desired weight of fish can be readily landed by it. The thin edge of the hoop D and D' also facilitates the passage of the net through the water.

It is evident that other means may be used to prevent the turning of the net when the hoop is expanded—as, for instance, the head-plate $a$ might be made square and properly countersunk in the thimble C. I do not limit myself, however, to either of these methods. Also, the arms of the hoop D and D' might be covered, if desired, with a suitable fabric and the net sewed thereto; or any other ordinary and convenient manner of attaching a net to a hoop may be employed.

I prefer, for the purpose of catching minnows or bait, to provide a separate net secured to narrower and thinner spring-arms of a hoop, F and F', as shown in Figs. 5 and 6, said arms turned at the ends to form flanges, or otherwise provided with lips $f$, whereby it may be secured in the arms D and D'. For ordinary purposes ends or shoulders of the arms D D' at the hinges $d$ may suffice for the engagement of the flanges at the outer ends of the arms; or, if preferred, apertures might be formed in the hinge-pieces $d$ to receive the lips or flanges $f$. The curved flange on the inner ends of the arms may be placed under the extended ends $c^2$ and $c^3$ of the braces E and E' and be held securely by them when the net is expanded. This separate bait-net is thus adapted to be put into that previously described, as shown in Fig. 6. When not in use it is intended to be taken out, folded up, and stowed away in any convenient place.

I am aware that heretofore the hoop of a bait-net has been provided with hinges so as to be folded, and having its sides connected by rods with a sliding sleeve on the staff or rod, so that by operating said sleeve the hoop may be expanded or collapsed, as desired, and I do not claim such construction, broadly.

What I claim is—

1. In a collapsible landing and bait net, a hoop constructed of two spring-arms, hinged together at their outer ends and at their inner ends hinged to a sleeve, in combination with two braces hinged to said arms and to a thimble, said sleeve and thimble adapted to pass over a staff, substantially as described.

2. A collapsible landing and bait net consisting of a hoop constructed of two spring-arms, hinged together at their outer ends and at their inner ends hinged to a sleeve, in combination with two braces hinged to said arms and to a thimble, a net secured to the arms of the hoop, a staff inserted through the sleeve and the thimble, and secured therein by a head-plate adapted to engage with the thimble when the hoop is expanded, said head-plate held firmly against the thimble, when thus engaged, by the projecting ends of the braces, to keep the net from turning on the pole, substantially as described.

3. In a collapsible landing and bait net, a hoop constructed of two perforated spring-arms, hinged together at their outer ends, made heavier at their inner ends, and hinged thereat to a sleeve, in combination with two braces hinged to said arms and to a thimble, said sleeve and thimble adapted to pass over a staff, substantially as described.

4. In a collapsible landing and bait net, the spring-arms F and F', in combination with a suitable net, said arms provided with means whereby they may be secured within the arms D D', substantially as described.

In testimony whereof I sign this specification in the presence of two witnesses.

JASPER N. DODGE.

Witnesses:
J. EDWARD WARREN,
SAMUEL E. THOMAS.